(12) United States Patent
Hazelton et al.

(10) Patent No.: US 7,484,405 B2
(45) Date of Patent: Feb. 3, 2009

(54) SYSTEM AND METHOD FOR ENGINE SOUND CALIBRATION

(75) Inventors: Gary J. Hazelton, White Lake, MI (US); Fabien G. Redon, Southfield, MI (US); Boris D. Stojkovic, Ann Arbor, MI (US); Konstantin V. Tanin, Ann Arbor, MI (US); Sherif H. Tahry, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 105 days.

(21) Appl. No.: 11/740,305

(22) Filed: Apr. 26, 2007

(65) Prior Publication Data

US 2008/0264149 A1 Oct. 30, 2008

(51) Int. Cl.
*G01M 15/00* (2006.01)

(52) U.S. Cl. .................................. 73/114.07; 73/35.09
(58) Field of Classification Search ................ 73/35.01, 73/35.06, 35.07, 35.09, 35.11, 114.02, 114.07
See application file for complete search history.

(56) References Cited

U.S. PATENT DOCUMENTS

| | | | | |
|---|---|---|---|---|
| 5,445,026 A | * | 8/1995 | Eagan | 73/591 |
| 6,850,836 B1 | * | 2/2005 | Scholl et al. | 701/115 |
| 6,892,568 B2 | * | 5/2005 | Witer et al. | 73/114.01 |
| 2004/0149022 A1 | * | 8/2004 | Witer et al. | 73/117.1 |
| 2004/0260453 A1 | * | 12/2004 | Sauler et al. | 701/111 |
| 2008/0190185 A1 | * | 8/2008 | Zimmer | 73/114.07 |

* cited by examiner

*Primary Examiner*—Eric S McCall

(57) ABSTRACT

A method for calibrating an engine is provided. The engine includes a cylinder for combustion of a fuel. The method includes setting combustion parameters of the engine, detecting a combustion noise during combustion proximate to the cylinder, detecting an engine sound radiated from the engine during combustion, adjusting the combustion parameters and repeating the steps of detecting a combustion noise and detecting an engine sound. The method further includes generating a relationship between the combustion noises and the engine sounds, determining a combustion noise level that correlates to a predefined engine sound threshold from the relationship, adjusting a speed of the engine and a load on the engine and repeating the previous steps to determine a combustion noise level for each engine speed and engine load setting, and calibrating the engine using the combustion noise levels.

12 Claims, 6 Drawing Sheets

SYSTEM AND METHOD FOR ENGINE SOUND CALIBRATION

FIELD

The present disclosure relates to calibrating an engine, and more particularly to calibrating an engine to meet engine sound objectives.

BACKGROUND

The statements in this section merely provide background information related to the present disclosure and may not constitute prior art.

A typical diesel engine in a motor vehicle is calibrated to meet emissions standards, power and torque requirements, and to meet fuel economy targets. Once those targets are met, the engine is then calibrated to account for sound radiated from the engine. However, by first calibrating for emissions, power, torque and fuel economy targets, the engine may have high combustion pressures and high pressure rise rates within the combustion cylinder. These pressures and rise rates can act as a dynamic forcing function on the structure of the diesel engine. This in turn can lead to the diesel engine radiating high noise levels, possibly exceeding the engine noise objectives. In addition, these high noise levels can be in excess of typical gasoline powered engine noise levels and can be aurally displeasing to the operator and passengers within the motor vehicle.

Therefore, it is desirable to calibrate diesel engines by considering engine sound requirements during the calibration process. Accordingly, the present invention seeks to provide the art with a method of calibrating the engine utilizing the combustion noise of the cylinder to meet engine radiated noise and sound quality objectives.

SUMMARY

The present invention provides a method for developing a relationship between cylinder combustion noise and radiated engine sound.

In one aspect of the present invention, the system includes the steps of setting a set of combustion parameters for the engine, detecting a combustion noise during combustion proximate to the cylinder, detecting an engine sound radiated from the engine during combustion, adjusting the combustion parameters and repeating the steps of detecting a combustion noise and detecting an engine sound, generating a relationship between the detected combustion noises and the detected engine sounds, determining a combustion noise level that correlates to a predefined engine sound threshold from the relationship, adjusting a speed of the engine and a load on the engine and repeating the previous steps to determine a combustion noise level for each engine speed and engine load setting and calibrating the engine using the combustion noise levels.

In another aspect of the present invention, the system includes the step of generating a relationship between the combustion noise and the engine sound includes generating a loss function that relates the combustion noise to the engine sound.

In another aspect of the present invention the loss function is a linear or other relationship between the combustion noise and the engine sound.

In still another aspect of the present invention the step of determining a combustion noise level includes entering the engine sound threshold into the loss function to calculate the combustion noise level.

In another aspect of the present invention, the system includes the step of validating the engine calibration to determine the accuracy of the combustion noise levels.

In another aspect of the present invention the step of calibrating the engine includes using engine exhaust emission targets, fuel economy targets, and engine performance targets with the combustion noise levels.

In another aspect of the present invention the step of setting the combustion parameters includes setting at least one of, or a combination of, a fuel injection timing, exhaust gas recirculation rate, fuel rail pressure, pilot injection fuel quantity, and number of pilot injections.

The present invention further provides a system for calibrating an engine, the engine having a cylinder for combustion of a fuel.

In one aspect of the present invention, the system includes a dynamometer for changing a speed of the engine and a load on the engine, an engine calibration system in communication with the engine for varying a set of combustion parameters for the engine, and a noise/vibration/harshness system for detecting a combustion noise proximate to the cylinder of the engine during combustion and for detecting an engine sound radiated from the engine during combustion, the system having a controller having a first control logic for detecting the combustion noise and for detecting the engine sound for each of a set of the combustion parameters, a second control logic for generating a relationship between the combustion noise and the engine sound, a third control logic for determining from the generated relationship a combustion level that correlates to a predefined engine sound threshold, and a fourth control logic for repeating the first control logic, the second control logic, and the third control logic to determine a combustion noise level for each of an engine speed and engine load setting set by the dynamometer.

In another aspect of the present invention, the second control logic generates a loss function that relates the combustion noise to the engine sound.

In another aspect of the present invention, the loss function is a linear relationship between the combustion noise and the engine sound, but is not limited to this linear relationship.

In still another aspect of the present invention, the third control logic determines the combustion noise level by entering the engine sound threshold into the loss function to calculate the combustion noise level.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4:
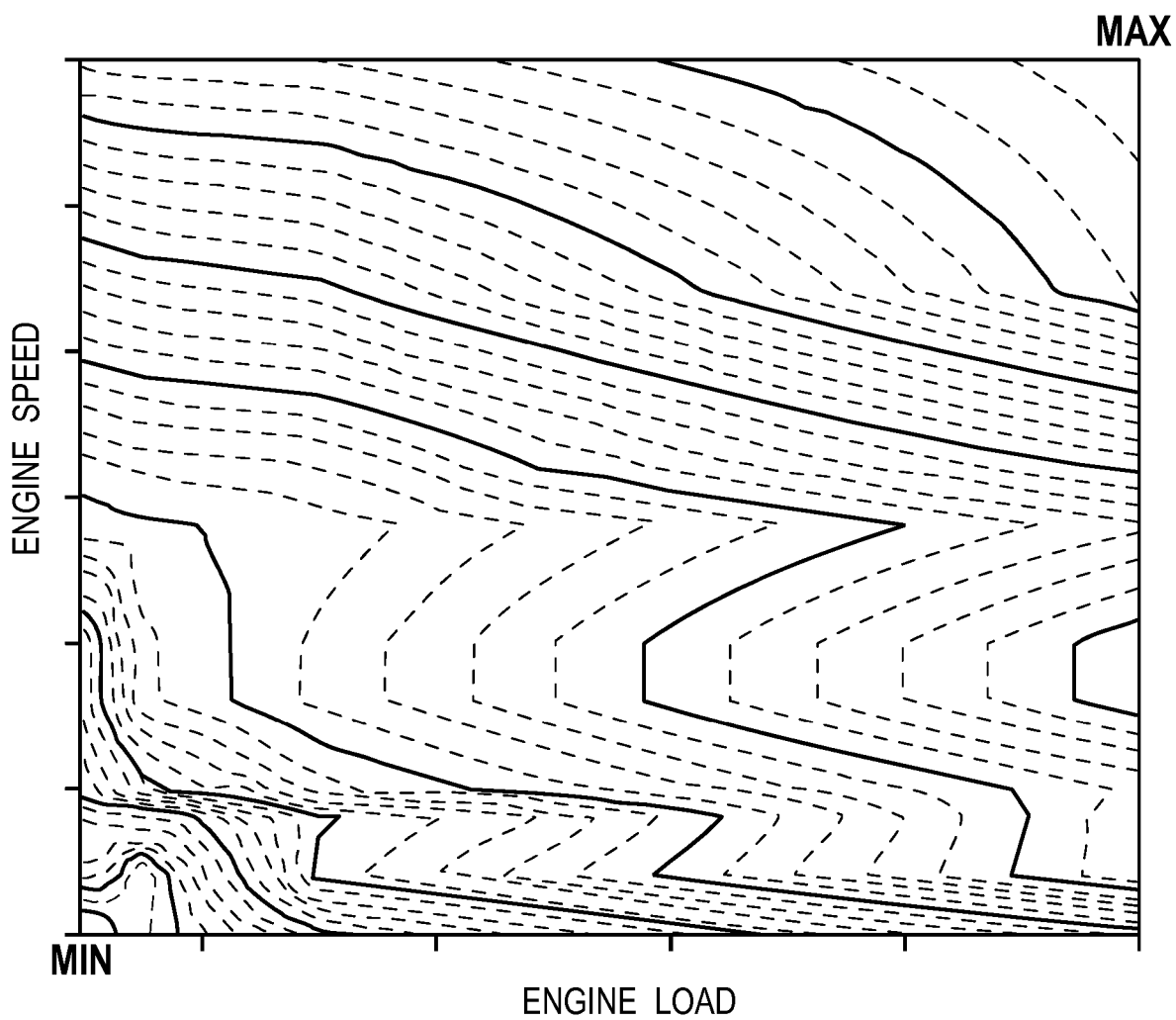
Figure 5:
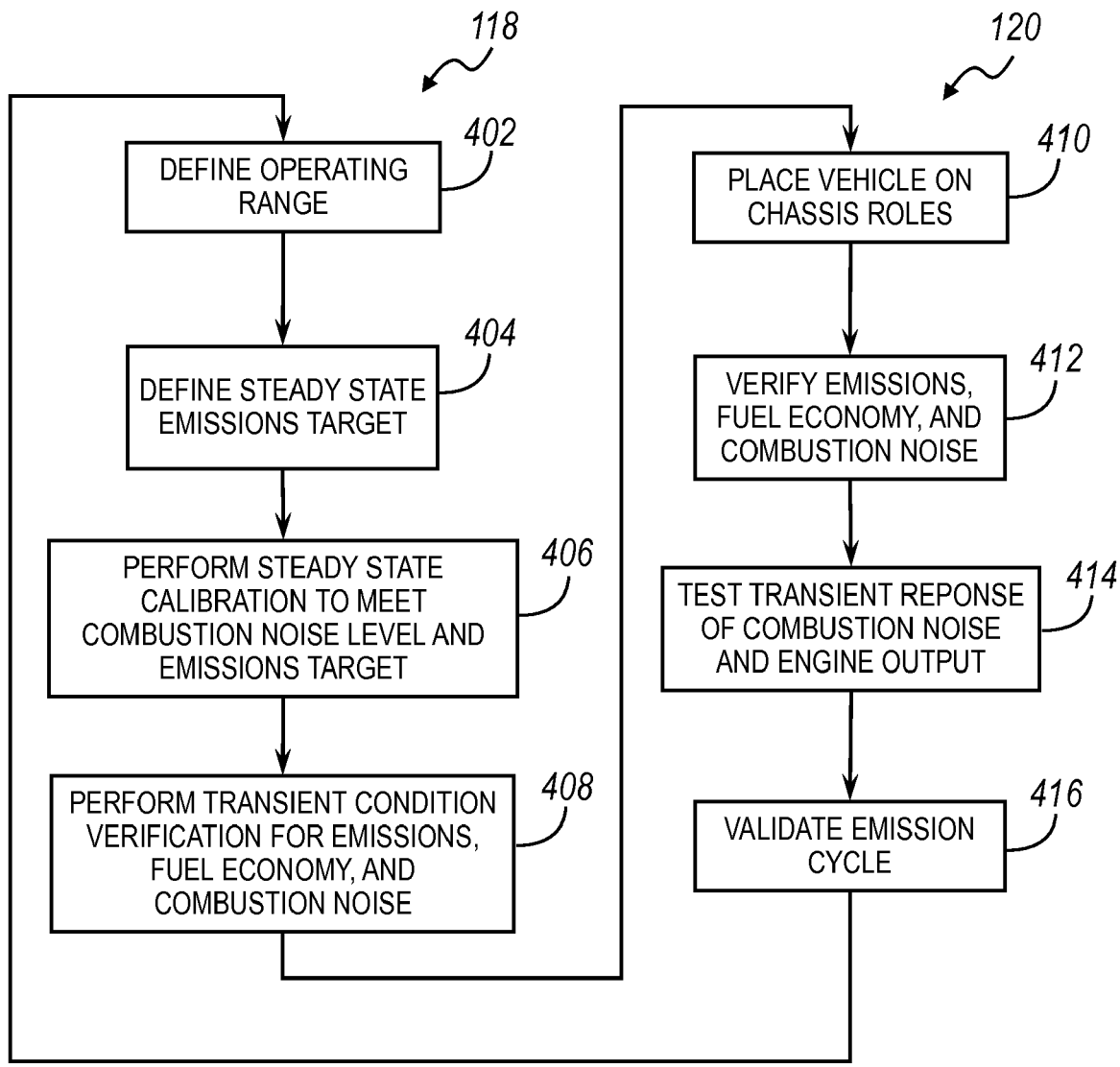

FIG. 4. is a graph illustrating an exemplary contour plot of cylinder combustion noise levels for various engine speeds and engine loads; and FIG. 5 is a flow chart of a method of calibrating the engine using the cylinder combustion noise and verifying the calibration of the engine.

DETAILED DESCRIPTION

The following description is merely exemplary in nature and is not intended to limit the present disclosure, application, or uses.

Figure 1:
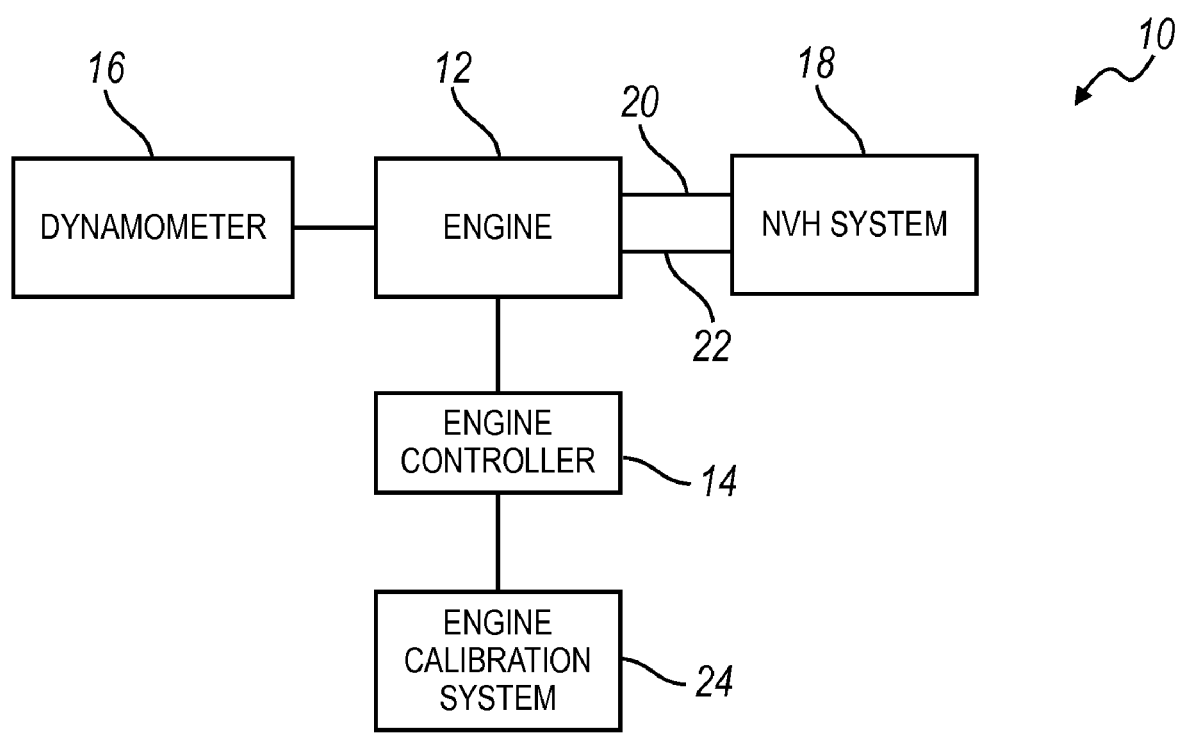
FIG. 1 is a schematic diagram of a system used to generate a relationship between cylinder combustion noise and engine sound in an engine according to the principles of the present invention.

FIG. 1 illustrates a system 10 for developing a cylinder combustion noise versus engine sound function for an engine 12 according to the principles of the present invention. In the particular example provided, the engine 12 is a combustion diesel engine, however it should be appreciated that the engine 12 may take various forms and the present invention is not limited to any one particular type of engine 12. The engine 12 includes an at least one combustion cylinder (not shown) used for combustion of a fuel. The engine 12 is in electronic communication with an engine controller 14. The engine controller 14 is an electronic device having a preprogrammed digital computer or processor, control logic, memory used to store data, and at least one I/O section. The control logic includes a plurality of logic routines for monitoring, manipulating, and generating data. The engine controller 14 is operable to set various combustion parameters for the engine 12. These combustion parameters include, but are not limited to, fuel injection timing, exhaust gas recirculation rates, fuel rail pressure, pilot injection fuel quantity, and the number of pilot injections. The engine controller 14 is further operable to sense the operating parameters of the engine 12 using a plurality of sensors within the engine 12.

The system 10 further includes a dynamometer 16 coupled to the engine 12. The dynamometer 16 is a device known in the art for adjusting the speed of the engine and the load on the engine. One of any kind of various dynamometers may be employed with the present invention.

A noise/vibration/harshness system (NVH system) 18 is also coupled to the engine 12. The NVH system 18 is operable to measure engine sound, indicated by line 20, and cylinder combustion noise, indicated by line 22. The engine sound is the engine sound radiated through the air from the engine 12 during combustion of the fuel within the cylinders. The cylinder combustion noise is the noise level at one of, or a plurality of, the combustion cylinders within the engine 12 during combustion of the fuel within the cylinders. The NVH system 18 may be further operable to measure the vibration of the engine 12. In the preferred embodiment, the cylinder combustion noise is measured using an AVL combustion noise meter, though various other kinds of sensors may be employed. The NVH system 18 further includes a controller or other electronic device having a preprogrammed digital computer or processor, control logic, memory used to store data, and at least one I/O section. The control logic includes a plurality of logic routines for monitoring, manipulating, and generating the cylinder combustion noise and engine sound data.

The system 10 further includes an engine calibration system 24. The engine calibration system 24 is in electronic communication with the engine controller 14. The engine calibration system 24 is operable to vary the combustion parameters of the engine 12 by communicating with the engine controller 14.

Figure 2A:
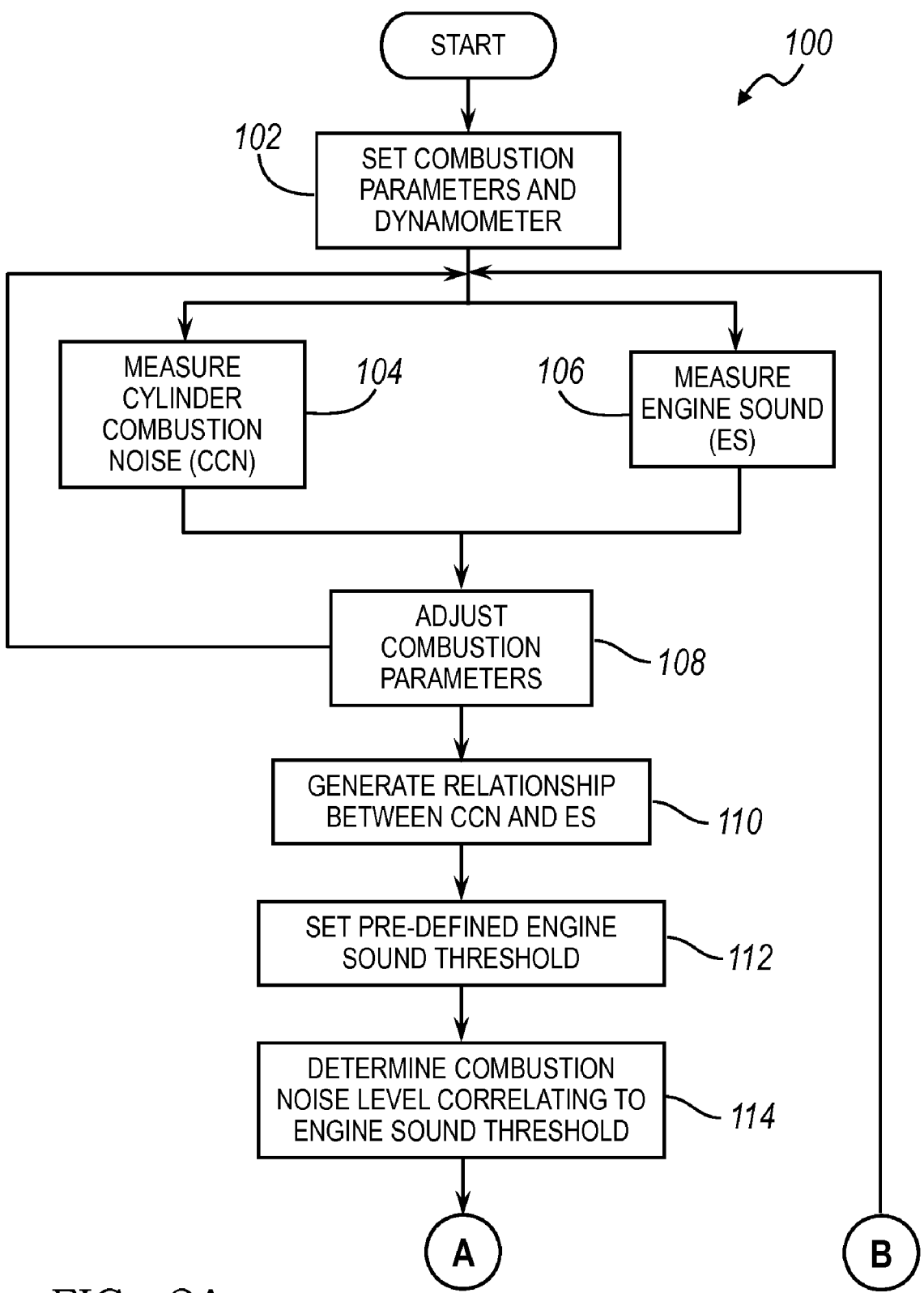
FIGS. 2A and 2B is a flow chart of a method for generating a relationship between cylinder combustion noise and engine sound using the system of the present invention.
Figure 2B:
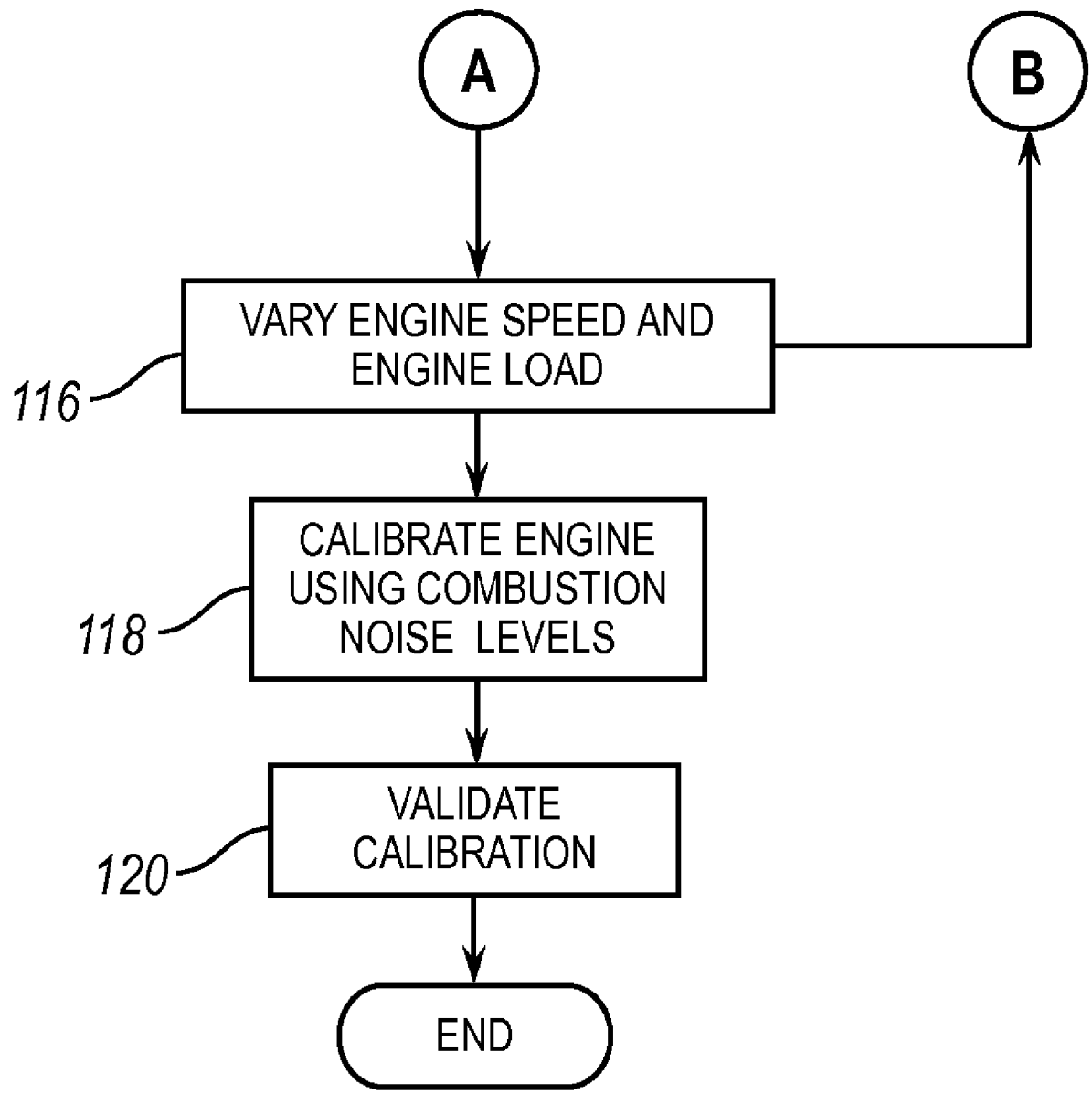

With reference now to FIGS. 2A and 2B and continued reference to FIG. 1, a method 100 for developing a cylinder combustion noise versus engine sound function employing the system 10 is illustrated in flowchart form. The method 100 begins at step 102 where the engine calibration system 24 communicates with the engine controller 14 to set the combustion parameters of the engine 12 during combustion of the fuel within the cylinders. The operating parameters include the fuel pressure within the fuel rail, fuel injection timing, exhaust gas recirculation rates, pilot injection fuel quantity, and the number of pilot injections. Various other operating parameters may be included without departing from the scope of the present invention. Also at step 102, the dynamometer 16 is used to set an initial speed of the engine 12 and an initial load on the engine 12.

At step 104, the NVH system 18 detects the cylinder combustion noise proximate to the cylinder within the engine 12. The NVH system 18 records and stores the combustion noise data for the set combustion parameters and the dynamometer 16 settings.

At step 106, the NVH system 18 measures the engine sound radiated through the air from the engine 12. The NVH system 18 records and stores the engine sound data for the set combustion parameters and the dynamometer 16 settings.

At step 108, the engine calibration system 24 adjusts the combustion parameters of the engine 12 by communicating with the engine controller 14 in order to vary the cylinder combustion noise and radiated engine sound. Which of the combustion parameters is varied depends on the combustion mode used with the engine 12. For example, if the combustion mode is using a pre-mix charge compression ignition, then the engine calibration system 24 varies the fuel injection timing of the main injection, the fuel injection timing and quantity of the pilot injection, the exhaust gas recirculation rate, and the fuel rail pressure. If the combustion mode is using a homogeneous charge compression ignition, then the engine calibration system 24 varies the fuel injection timing of the main injection, the pilot injection fuel quantity, the number of pilot injections, the exhaust gas recirculation rate, and the fuel rail pressure. Additionally, variable geometry turbo may also be adjusted in order to vary the level of intake air during engine operating conditions. It should be appreciated that various combinations of combustion parameters may be varied without departing from the scope of the present invention.

As noted above, adjusting the combustion parameters in turn alters the amount of cylinder combustion noise and the amount of engine sound radiated from the engine 12. The method 100 then repeats steps 104 and 106 at least one time to record cylinder combustion noise and engine sound for the adjusted combustion parameters.

Once steps 104 and 106 have been repeated at least once for a different set of combustion parameters, a relationship between the measured cylinder combustion noise data and the measured engine sound data is generated at step 110. This relationship correlates the measured cylinder combustion noise to the measured radiated engine sound for the given set of combustion parameters and dynamometer 16 settings. In the preferred embodiment, the relationship is a loss function. The loss function is a mathematical function that describes a linear relationship between the cylinder combustion noise measured at the cylinders of the engine 12 and the engine sound radiated from the engine 12. Alternatively, the loss function may describe a non-linear relationship, depending on the speed and load conditions. Additionally, a lookup table or chart may be generated and stored within the NVH system 18 that correlates the measured cylinder combustion noise data with the measured engine sound data.

At step 112 an engine sound threshold is selected. The engine sound threshold is pre-defined and is a target radiated engine sound desirable for the given engine 12. The engine sound threshold is determined using a number of factors, including, but not limited to, the application the engine 12 is intended for (commercial vehicle, passenger vehicle, etc.) as well as the given engine speed and engine load settings. The engine sound threshold is stored in memory within the engine calibration system 24 or the NVH system 18. Additionally, the engine sound threshold may be stored in a lookup table.

At step 114, a combustion noise level is determined from the engine sound threshold using the relationship generated at step 110. The combustion noise level is specific to the given engine speed and engine load settings. As noted above, the relationship generated at step 110 may take the form of a loss function or lookup table. Accordingly, the combustion noise level may be determined using the loss function generated at step 110 to calculate the combustion noise level from the engine sound threshold. Alternatively, the combustion noise level may be determined by using the lookup table generated at step 110 to look up the combustion noise level corresponding to the engine sound threshold. For engine threshold levels that do not correspond to the engine sound data directly measured at step 106, the combustion noise level is an extrapolation or interpolation from the cylinder combustion noise and engine sound correlation.

At step 116, the dynamometer 16 changes the engine speed and engine load settings from the initial settings provided at step 102. Alternatively, the engine speed and engine load settings may be adjusted using vehicle or chassis rolls, or any other available means. The dynamometer 16 may change the speed of the engine and the load on the engine individually or simultaneously. The method 100 then repeats steps 104, 106, 108, 110, 112 and 114 at least one time. For each engine speed and engine load setting that is set at step 116, the method 100 will determine a combustion noise level that correlates to the pre-defined engine sound thresholds. Preferably, the method 100 will repeat steps 104-114 to determine a combustion noise level for a range of speed settings and a range of load settings.

Once the method 100 has determined a set of combustion noise levels for each set of engine speed and engine load settings, the engine 12 is then calibrated at step 118. The calibration is performed using the combustion noise levels as accurate estimates of the pre-defined engine sound thresholds. The calibration process also uses engine exhaust emission targets, fuel economy targets, and engine performance targets along with the combustion noise levels, as will be described in further detail below. In the preferred embodiment, calibration of the engine 12 involves defining an operating range of the engine 12, defining emission targets, then using the combustion noise level with the emission targets to optimize for fuel economy.

At step 120, the calibration settings performed in step 118 are validated using a testing process. Any inaccuracies or problems may then be corrected by re-calibrating the engine as needed. In the preferred embodiment, the validation process involves verifying combustion noise levels and emissions targets on a steady state chassis roll, testing the transient response of the combustion noise levels, emissions targets, and performance levels, validating on an emission cycle, and then adjusting the engine 12 as needed.

Figure 3:
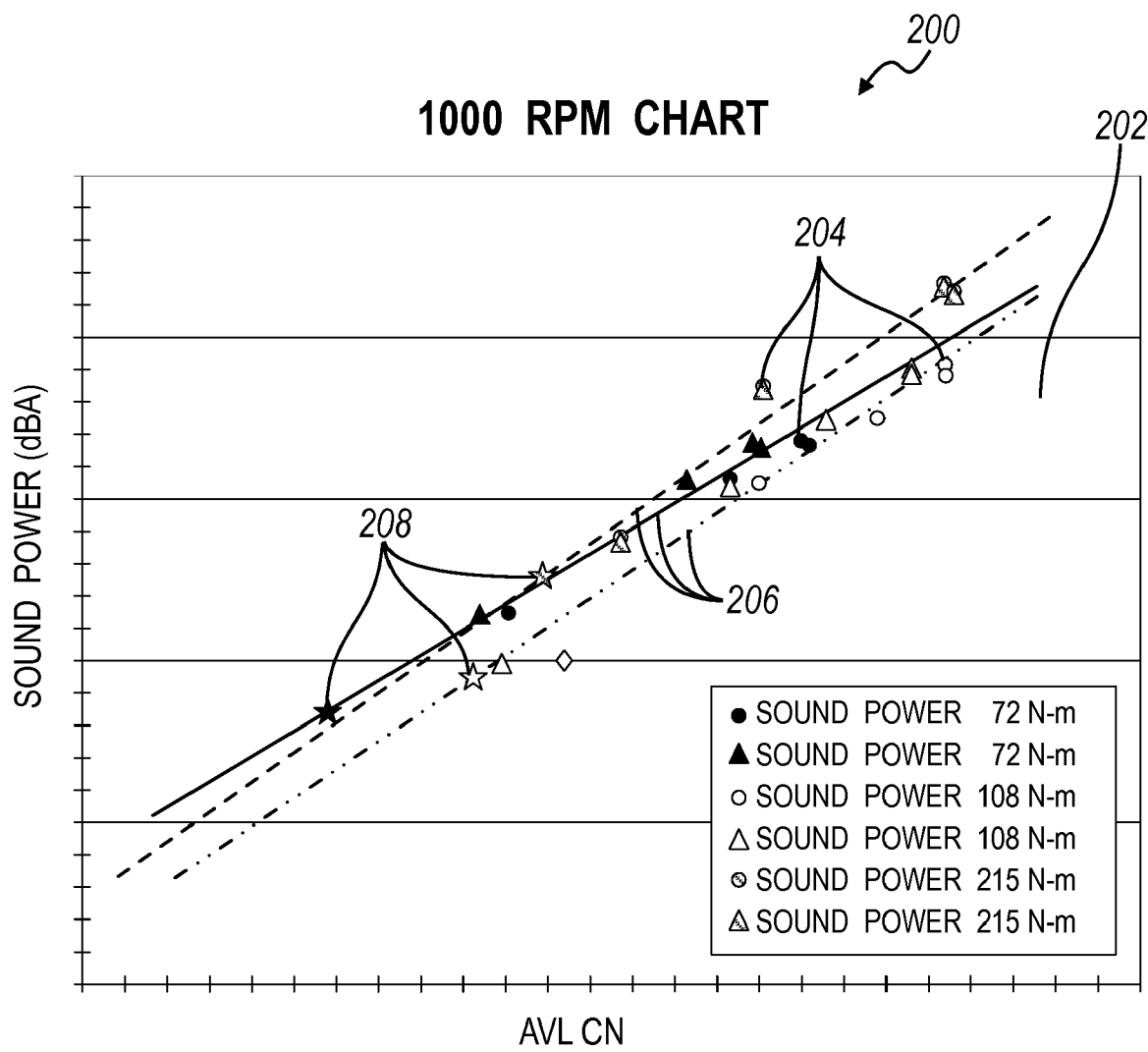
FIG. 3 is a graph illustrating an exemplary relationship between cylinder combustion noise and engine sound.

FIG. 3 illustrates an exemplary relationship 200 between cylinder combustion noise and engine sound generated at step 110 in FIG. 2A. The relationship 200 is illustrated graphically in a chart 202, wherein the x-axis of the chart 202 is defined as the measured combustion noise (AVL CN) near the cylinder of the engine 12 in decibels and the y-axis of the chart 202 is defined as the measured engine sound (Sound Power in decibels) radiated from the engine 12. The relationship 200 provided is for a set engine speed of 1000 rotations per minute. Measured cylinder combustion noise and measured engine sound are plotted on the chart 202 and are indicated by points 204 for each of a set of load settings. In the particular example provided, load settings of 72 N-m, 108 N-m, and 215 N-m are used and indicated by separate points. A loss function 206 is then calculated from these points 204 for each load setting, as seen by the three separate lines. The loss function 206 is estimated as a linear relationship having a positive slope, but the loss function 206 is not limited to this linear relationship. Engine sound thresholds may be plotted on the relationship 200, as indicated by points 208, and a combustion noise level determined from the combustion noise corresponding on the x-axis to the engine sound threshold 208. To enhance or improve the relationship 200, adjustments that account for acoustic requirements may be made to individual data points or to the loss function 206.

FIG. 4 illustrates an exemplary combustion noise level contour plot 300. The plot 300 plots the combustion noise levels for each engine speed setting and each engine load setting set at step 116 in FIG. 2A. The x-axis of the plot 300 is defined as the load settings and the y-axis of the plot 300 is defined as the engine speed settings in rotations per minute. For each combination of engine speed and engine load, a combustion noise level may be determined and included in the plot 300. This plot 300 is useful for assisting in the calibration of the engine 12 in step 118 in FIG. 2B.

Turning now to FIG. 5, the step 118 of calibrating the engine and the step 120 of verification of the calibration is shown in an expanded flow chart. Calibration of the engine 12 begins as the engine 12 is coupled to the dynamometer 16. At step 402, an operating range is defined at steady state conditions wherein the engine speed and engine load are held constant. At step 404, a steady state emissions target is defined. This steady state emissions target is defined to meet emission cycle requirements.

At step 406, steady state calibrations are performed to meet the combustion noise levels determined at step 114 and to meet the emissions target. Steady state calibrations are performed at predetermined engine power and engine torque amounts. Optimization for fuel economy is also performed on the engine 12. Alternatively, steps 402-406 may be performed during transient engine conditions wherein engine speed and engine load are continuously varied to reflect typical driving conditions. At step 408, transient condition verification is performed for emissions, fuel economy, and noise. During transient condition verification, engine speed and engine load are continuously varied. Transient condition verification is conducted in order to identify possible engine operating conditions where the target combustion noise level is exceeded. The target combustion noise may be exceeded for various reasons, for example, due to a response lag in an air handling system. Further adjustments in the calibration are applied as necessary during step 408.

Verification of the calibration begins at step 410 when the assembled vehicle, including the engine 12, is placed on chassis rolls. Then, at step 412, emissions, combustion noise and fuel economy are verified for the vehicle and engine 12 on a chassis dynamometer. Any required modifications to the vehicle and the engine 12 are made at this time. At step 414, transient response of the combustion noise and the engine output is tested. At step 416, validation of the emission cycles is performed and any necessary iterations of the validation process are performed. The validation data determined at step 416 is then used in repeats of steps 402-408 to improve the optimization and calibration of the engine 12.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for calibrating an engine, the engine having a cylinder for combustion of a fuel, the method comprising the following steps:
    setting a set of combustion parameters for the engine;
    detecting a combustion noise during combustion proximate to the cylinder;
    detecting an engine sound radiated from the engine during combustion;
    adjusting the combustion parameters and repeating the steps of detecting a combustion noise and detecting an engine sound;
    generating a relationship between the detected combustion noises and the detected engine sounds;
    determining a combustion noise level that correlates to a predefined engine sound threshold from the relationship;
    adjusting a speed of the engine and a load on the engine and repeating the previous steps to determine a combustion noise level for each engine speed and engine load setting; and
    calibrating the engine using the combustion noise levels.

2. The method of claim 1 further comprising the step of validating the engine calibration to determine the accuracy of the combustion noise levels.

3. The method of claim 1 wherein the step of calibrating the engine includes using engine exhaust emission targets, fuel economy targets, and engine performance targets with the combustion noise levels.

4. The method of claim 1 wherein the step of setting the combustion parameters includes setting at least one of a fuel injection timing, exhaust gas recirculation rate, fuel rail pressure, pilot injection fuel quantity, and number of pilot injections.

5. The method of claim 1 wherein the step of generating a relationship between the combustion noise and the engine sound includes generating a loss function that relates the combustion noise to the engine sound.

6. The method of claim 5 wherein the loss function is a linear relationship between the combustion noise and the engine sound.

7. The method of claim 6 wherein the step of determining a combustion noise level includes entering the engine sound threshold into the loss function to calculate the combustion noise level.

8. A system for calibrating an engine, the engine having a cylinder for combustion of a fuel, the system comprising:
    a dynamometer for changing a speed of the engine and a load on the engine;
    an engine calibration system in communication with the engine for varying a set of combustion parameters for the engine; and
    a noise/vibration/harshness system for detecting a combustion noise proximate to the cylinder of the engine during combustion and for detecting an engine sound radiated from the engine during combustion, the system having a controller having a first control logic for detecting the combustion noise and for detecting the engine sound for each of a set of the combustion parameters, a second control logic for generating a relationship between the combustion noise and the engine sound, a third control logic for determining from the generated relationship a combustion level that correlates to a predefined engine sound threshold, and a fourth control logic for repeating the first control logic, the second control logic, and the third control logic to determine a combustion noise level for each of an engine speed and engine load setting set by the dynamometer.

9. The method of claim 8 wherein the combustion parameters include settings for at least one of a fuel injection timing, exhaust gas recirculation rate, fuel rail pressure, pilot injection fuel quantity, and number of pilot injections.

10. The system of claim 8 wherein the second control logic generates a loss function that relates the combustion noise to the engine sound.

11. The method of claim 10 wherein the loss function is a linear relationship between the combustion noise and the engine sound.

12. The method of claim 11 wherein the third control logic determines the combustion noise level by entering the engine sound threshold into the loss function to calculate the combustion noise level.

* * * * *